(12) United States Patent
Drapkin et al.

(10) Patent No.: US 6,297,683 B1
(45) Date of Patent: Oct. 2, 2001

(54) VOLTAGE SUPPLY DISCRIMINATOR AND METHOD

(75) Inventors: Oleg Drapkin, North York; Grigori Temkine, Toronto, both of (CA)

(73) Assignee: ATI International Srl, Christ Church (KN)

( * ) Notice: Subject to any disclaimer, the term of this patent is extended or adjusted under 35 U.S.C. 154(b) by 0 days.

(21) Appl. No.: 09/211,115

(22) Filed: Dec. 14, 1998

(51) Int. Cl.[7] ........................................ H03L 5/00
(52) U.S. Cl. ...................... 327/333; 327/143; 326/63
(58) Field of Search ........................ 327/333, 374, 327/142, 143, 198, 50, 51, 52; 326/60, 63, 83

(56) References Cited

U.S. PATENT DOCUMENTS

| | | | |
|---|---|---|---|
| 5,400,290 | * | 3/1995 | Suma et al. ............... 365/226 |
| 5,898,330 | * | 4/1999 | Klass ........................ 327/211 |
| 6,014,053 | * | 1/2000 | Womack ..................... 327/538 |

OTHER PUBLICATIONS

A.G.P. Design Guide: Covering 1X, 2X, and 4X Modes and 1.5 Volt and 3.3 Volt Signaling (Revision 1.0 Intel Corporation, Aug. 1998); and Accelerated Graphics Port Interface Specification (Revision 2.0, Intel Corporation, May 4, 1998).

* cited by examiner

Primary Examiner—Terry D. Cunningham
Assistant Examiner—An T. Luu
(74) Attorney, Agent, or Firm—Vedder, Price Kaufman & Kammholz (57) ABSTRACT

A voltage supply discriminator circuit senses multiple logic voltage supply levels and produces a plurality of control signals to select either or both of an output buffer circuit and/or an input buffer circuit that is coupled to a pad or pin. The discriminator circuit utilizes an input/output ring voltage supply and a reference voltage, such as a core voltage supply, to determine the appropriate circuitry to be used for the I/O pad. The appropriate circuitry is then automatically activated.

17 Claims, 6 Drawing Sheets

VOLTAGE SUPPLY DISCRIMINATOR AND METHOD

RELATED CO-PENDING APPLICATIONS

This is a related application to the following co-pending applications, filed on even date, having the same inventors and assigned to instant assignee:

1. Single Gate Oxide Differential Receiver and Method, having Ser. No. 09/211469;

2. Differential Input Receiver and Method for Reducing Noise, having Ser. No. 09/210969; and 3. Pre-buffer Voltage Level Shifting Circuit and Method, having Ser. No. 09/211496.

FIELD OF THE INVENTION

The invention relates generally to voltage supply discriminator systems and circuits and more particularly to voltage supply discriminator circuits and methods that may be used for input/output (I/O) pads supplied by different supply voltages.

BACKGROUND OF THE INVENTION

Graphics controller chips, like many integrated circuit devices, utilize CMOS, logic cores, and associated input/output (I/O) pads as part of their circuit makeup. I/O pads include, for example, input/output buffers coupled to a common pad or pin. There is a constant challenge to continuously design smaller, faster and more complicated integrated circuits to provide increased functionality for multimedia applications and other applications. Typically, the logic core operates at a different supply voltage than the I/O pads. For example, with logic cores having gate lengths of 0.25 um and 50 angstroms gate oxide, a core logic supply voltage may be 2.5 volts. Corresponding supply voltages for the input/output pads, however, may be different supply voltages such as 3.3 volts. However, future generation chips require faster speeds and lower power consumption, hence, lower supply voltages so that the I/O pads can switch at faster frequencies.

Also, integrated circuits must often provide compatibility with older versions of interface circuits. As a result, an integrated circuit may require that the I/O pads operate at either a 3.3 volt level, or for example, at a lower 1.5 volt level. The gate length and gate oxide thickness of I/O pad transistors must also typically be decreased to provide faster circuits that draw less current. With multilevel supply voltages, multi-gate oxide devices are often used to provide the requisite logic levels and overvoltage protection. However, a problem arises when multi-gate oxide transistors are used on the same chip. Using differing gate thickness' requires additional fabrication processes and, hence, results in higher fabrication costs. Moreover, the larger gate lengths can slow the device down unnecessarily. For low voltage CMOS signaling, the input/output pad must also be designed to prevent static leakage and prevent damage due to gate-source or gate-drain overvoltage.

Having different supply voltages allows the chip to interface with other circuits that may have different supply voltages. As such, these interfaces can work with older technologies and newer technologies. The circuitry on the interface may need to obtain or receive logical information that is at different voltage levels depending upon the differing supply voltage.

One solution has been to provide an external pin on the chip which is then externally tied to ground or a power supply voltage. For example, an external pin is used and tied to ground or a voltage supply depending on whether the circuit is designed for a higher or lower supply voltage. As such, typical designs provide separate printed circuit board designs for one supply voltage and a different printed circuit board design for another supply voltage. The use of a separate pin becomes costly and increases the size of the chip. Moreover, each pin is becoming more and more precious due to the increased complexity of circuitry within the core logic and the size limit for the chip.

Consequently, there exists a need for a multi-voltage supply discriminator for use with among other things, an I/O pad on an integrated circuit that has core logic. It would be desirable to eliminate the need for an external or additional pin for use in detecting voltage supply differences.

DETAILED DESCRIPTION OF A PREFERRED EMBODIMENT OF THE INVENTION

Briefly, a voltage supply discriminator circuit senses multiple logic voltage supply levels and produces a plurality of control signals to select either or both of an output buffer circuit and/or an input buffer circuit that is coupled to a pad or pin. The discriminator circuit utilizes an input/output ring voltage supply and a reference voltage, such as a core voltage supply, to determine the appropriate circuitry to be used for the I/O pad. The appropriate circuitry is then automatically activated.

Figure 1:
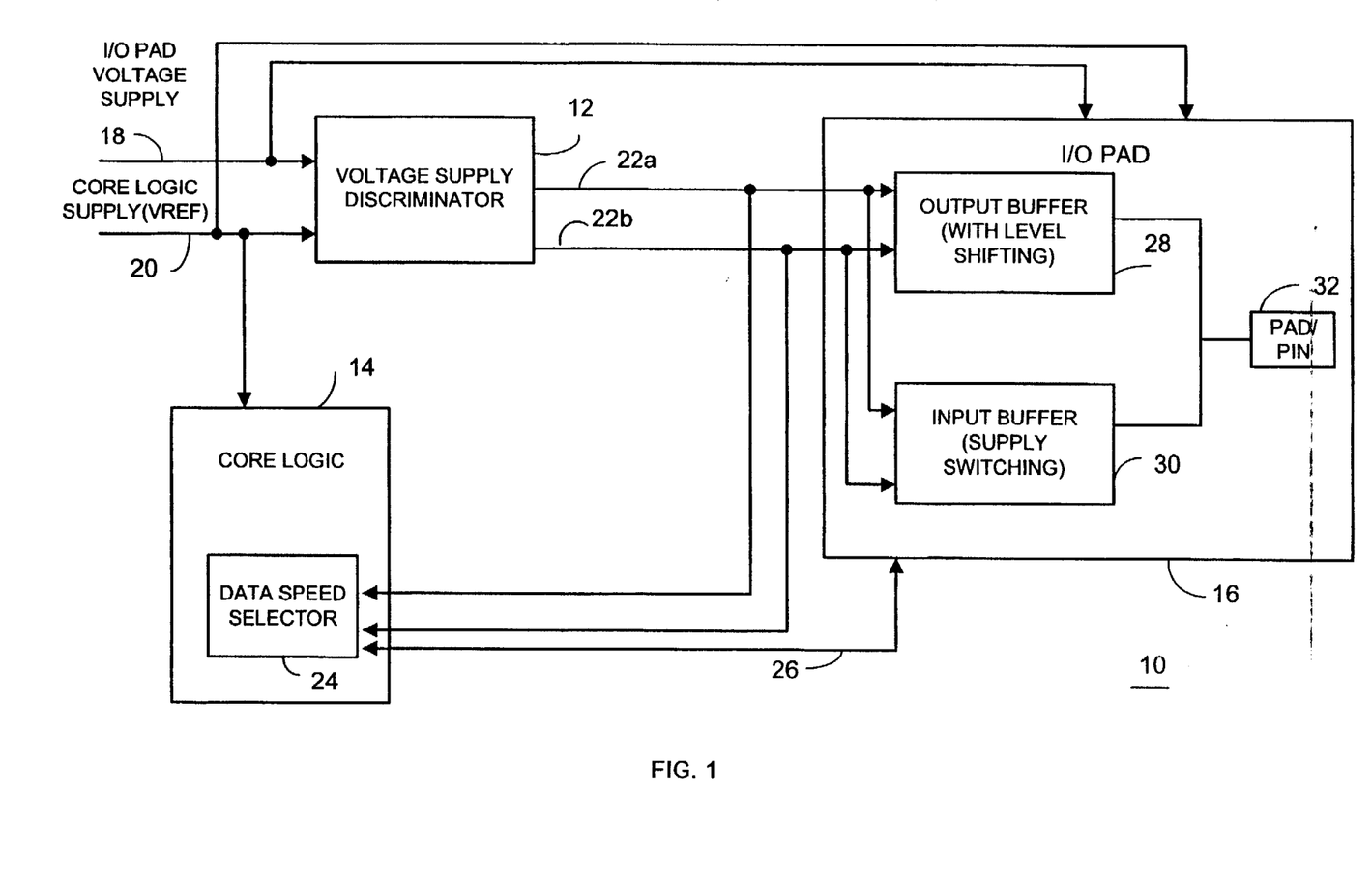
FIG. 1 is a block diagram illustrating a voltage supply discriminator circuit according to one embodiment of the invention used with an I/O pad and core logic.

FIG. 1 illustrates an integrated circuit 10 having a voltage supply discriminator 12, core logic 14 and an I/O pad 16 coupled to the core logic 14. The voltage supply discriminator 12 receives I/O pad voltage supply 18 which may be a multi-level supply voltage. For example, the I/O pad voltage supply may be 3.3 volts, for interfacing with one type of circuitry, and may be a different voltage supply, such as 1.5 volts, for interfacing with other external circuitry. The voltage supply discriminator 12 also receives a reference voltage such as another voltage supply 20. For example, the core logic supply voltage may be used as a reference voltage. The voltage supply discriminator 12 generates a plurality of multi-level control signals 22a and 22b for the I/O pad 16. The core logic 14 includes a data speed selector circuit 24 that also receives the plurality of multi-level voltage control signals 22a and 22b and depending upon the level of the control signals 22a and 22b, varies the rate at which data 26 is communicated with the I/O pad 16. For example, if the I/O pad voltage supply 18 is a low supply voltage, such as 1.5 volts and the control signals 22a and 22b indicate this lower supply voltage, a higher speed of operation is desired, and the data speed selector 24, as known in the art, varies the frequency of the core logic to increase the speed of the data transfer to and from the I/O pad. Similarly, a higher voltage supply 18 may indicate to the data speed selector to reduce the speed of operation. The data speed selector then selects the speed of operation compatible with a high voltage supply to operate at a slower speed, for example.

The I/O pad 16 includes an output buffer 28 that includes a level shifting circuit and an input buffer 30 which includes a supply switching circuit. The output buffer 28 and input buffer 30 are coupled to the pad or pin 32. The pad or pin 32 is coupled to external circuitry which preferably operates at the same supply voltage as the supply voltage supply 18.

The output buffer with level shifting circuit 28 shifts the logical zero level to a level above zero volts when, for example, the voltage supply 18 is 3.3 volts to ensure, among other things, that single oxide devices making up the output buffer operate within their normal operating range and do not unnecessarily degrade due to overvoltage conditions. A suitable output buffer with level shifting circuitry may be found for example in co-pending application entitled Buffer Voltage Level Shifting Circuit and Method, filed Dec. 14, 1998, having Ser. No. 09/211496 and owned by instant assignee.

The input buffer with supply switching circuitry includes circuitry which is switched depending upon the voltage supply level 18 to facilitate suitable operational speed of the input buffer for lower voltage supply conditions. The input buffer also utilizes single oxide devices. One example of a suitable input buffer with supply switching circuitry may be found for example in co-pending application entitled Single Gate Oxide Differential Receiver and Method, filed on even date, having Ser. No. 09/211469 and owned instant assignee.

Figure 2A:
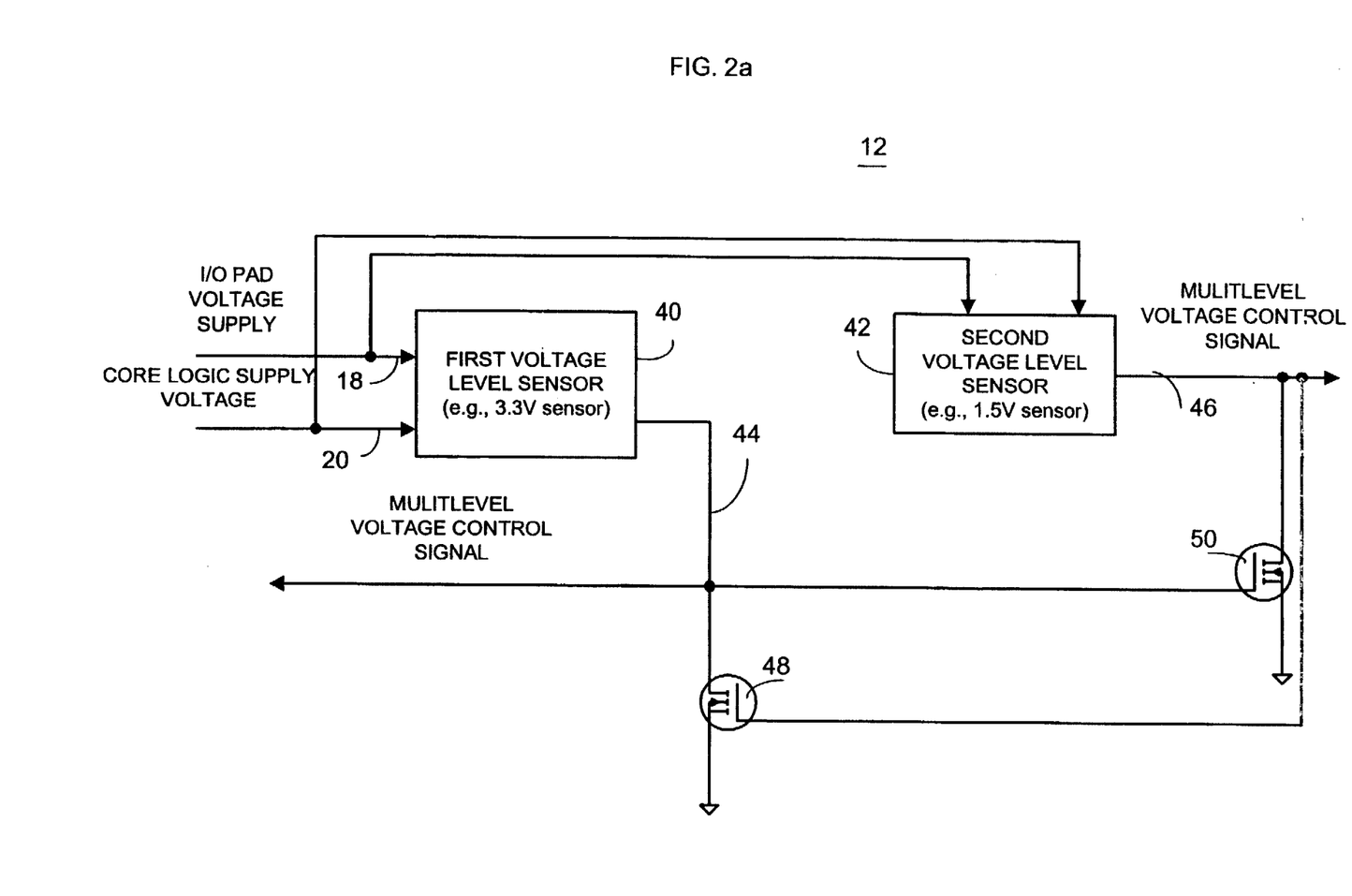
FIG. 2a is one embodiment of a voltage supply discriminator in accordance with one embodiment of the invention.

FIG. 2a illustrates a voltage supply discriminator 12 having a first logical voltage level sensor 40 and a second voltage level sensor 42. The first logical voltage level sensor circuit 40 receives the I/O pad supply voltage 18 and reference voltage (e.g. core logic voltage) 20 and produces a multi-level voltage control signal 44 that is communicated to the I/O pad 16. In addition, the second voltage level sensor 42 receives the I/O pad supply voltage 18 and the core logic supply voltage 20 and produces a second multi-level voltage control signal 46 that is output for the I/O pad 16.

The voltage supply discriminator 12 also includes a feedback circuit 48, in this embodiment an nmos transistor, for the first voltage level sensor 40 to facilitate the multi-voltage control signal 44 being set to a predetermined voltage level, such as zero volts when the other multi-voltage control signal 46 is set in a logic high level. Similarly, feedback circuit 50, such as an nmos transistor, is coupled to the multi-voltage control signal 46 generated by the second voltage level sensor 44 to ensure that this control signal is a logic zero level when the other multi-level voltage control signal is operating in a logic high (one) mode.

In operation, for purpose of example and assuming that the I/O pad voltage supply can be 3.3 volts or 1.5 volts, the first voltage level sensor 40 is used to sense the higher 3.3 volt voltage supply. As such, the multi-voltage control signal 44 is generated such that its level will be 3.3 volts if the I/O pad voltage supply is sensed to be 3.3 volts, otherwise the multi-voltage control signal 44 will be in a tri-state mode. The second voltage level sensor 42 is used to sense the other supply voltage, such as 1.5 volts. The multi-level control signal 46 is set to 2.5 volts if the I/O pad voltage supply is sensed to be 1.5 volts. Otherwise the multi-level control signal 46 is tri-stated. With the use of the feedback circuits 48 and 50, the multi-level voltage control signal 44 is forced to a logical zero state if the second voltage level sensor 42 detects a 1.5 voltage supply since the output would be 2.5 volts thereby turning on feedback circuit 48. In a similar manner, the multi-level voltage control signal 46 is forced to a zero volt level when the multi-level voltage control signal 44 is a logical high or logical one, in this case 3.3 volts if the I/O pad voltage supply 18 is detected to be 3.3 volts. A 3.3 volt signal on the gate of feedback circuit 50 forces the multi-level control signal 46 to ground.

Figure 2B:
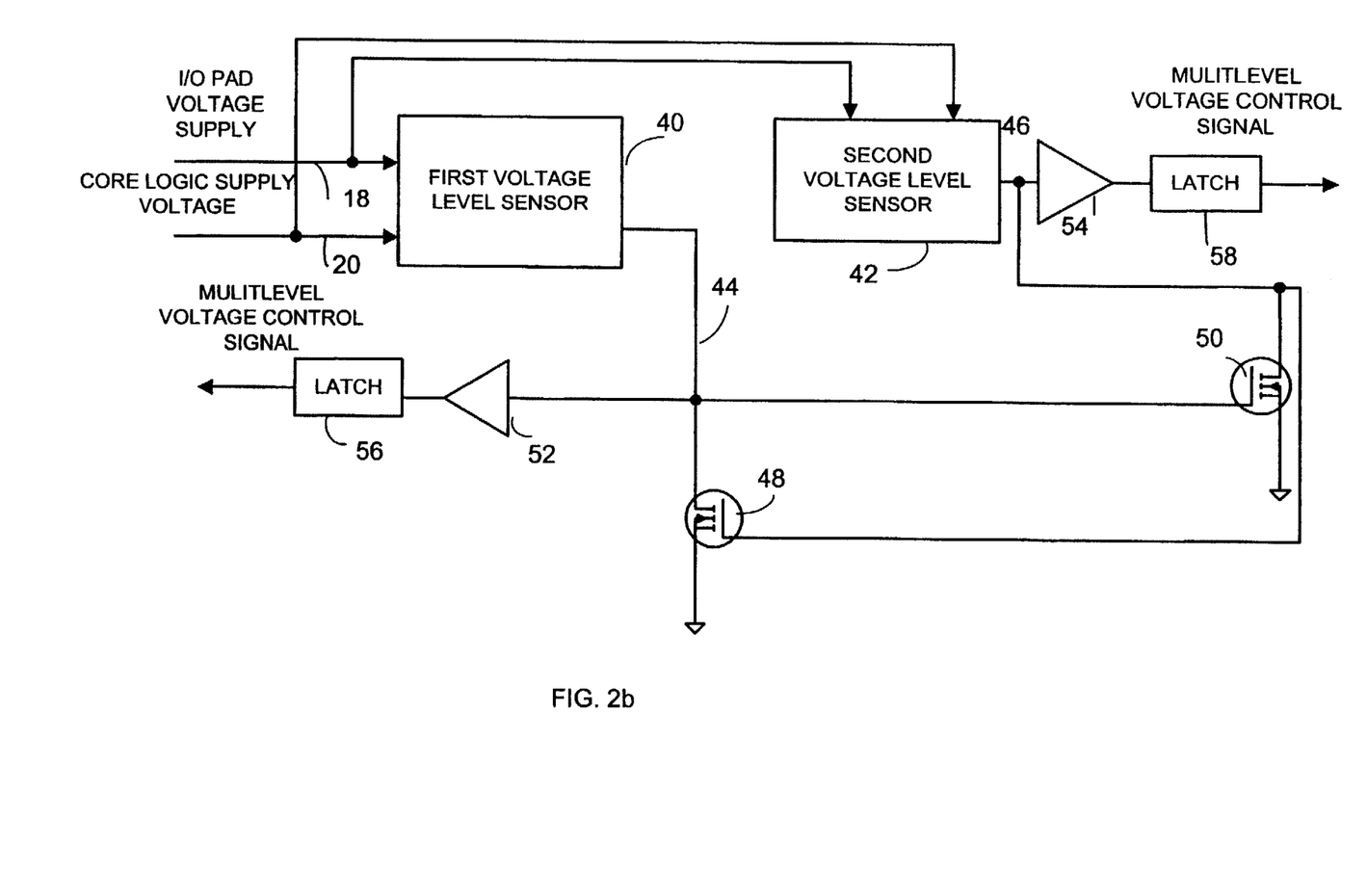
FIG. 2b is a block diagram of one embodiment of a voltage supply discriminator circuit in accordance with another embodiment of the invention.

FIG. 2b shows the use of a pair of buffers 52 and 54 which may be used for example where the multi-level voltage control signals are being transmitted over long distances on an integrated circuit. In addition, if desired, a plurality of latching circuits 56 and 58 may also be used to reduce the effect of noise on the multi-level control signals. The latching circuits 56 and 58 may be any suitable latching mechanism such as a Schmidt-trigger circuit or any other suitable latching circuit. Preferably, the buffers and latching circuits are also single gate oxide devices.

Figure 3:
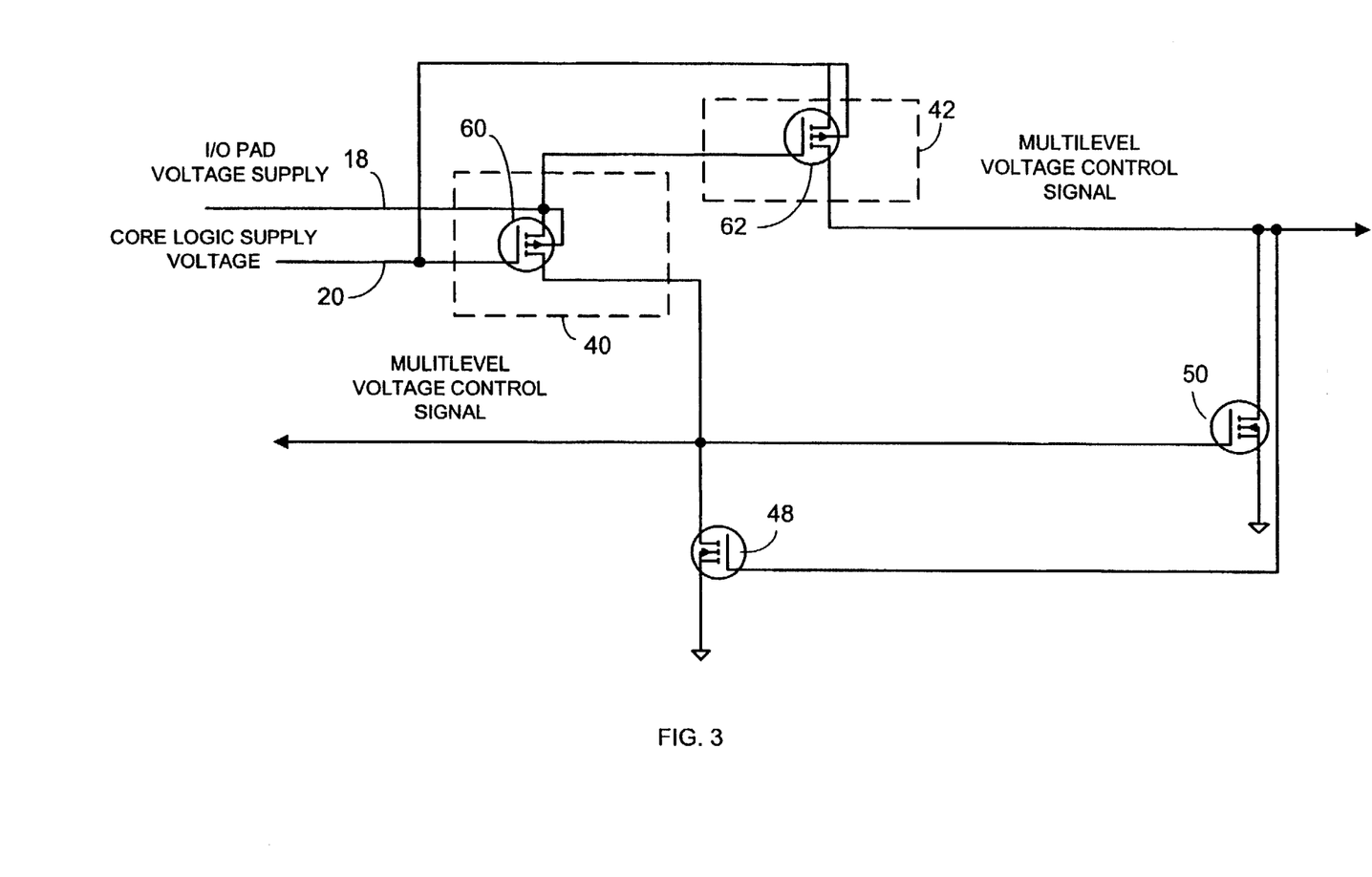
FIG. 3 is a circuit schematic diagram illustrating one embodiment of a voltage supply discriminator in accordance with the invention.

FIG. 3 shows one embodiment of the voltage level sensor 40 and the voltage level sensor 42. In this embodiment, the first voltage level sensor 40 may include a pmos transistor 60 having a gate coupled to the reference voltage supply, such as a core logic supply voltage, and a source coupled to the I/O pad voltage supply. The drain is coupled to the drain of feedback nmos transistor 48 and to the gate of the nmos transistor 50.

The second voltage level sensor 42 includes a pmos transistor 62 coupled to have its gate connected to the source of the first voltage level sensor transistor 60. It is also coupled to the I/O pad voltage supply line. A source of the second voltage level sensor pmos transistor 62 receives the core logic supply voltage 20 or other suitable reference voltage. The drain of the pmos transistor 62 is coupled to the drain of the feedback transistor 50 and to the gate of feedback transistor 48. This embodiment utilizes a single gate oxide pmos voltage level sensor circuit configuration to help reduce fabrication costs and to reduce the number of components.

Figure 4:
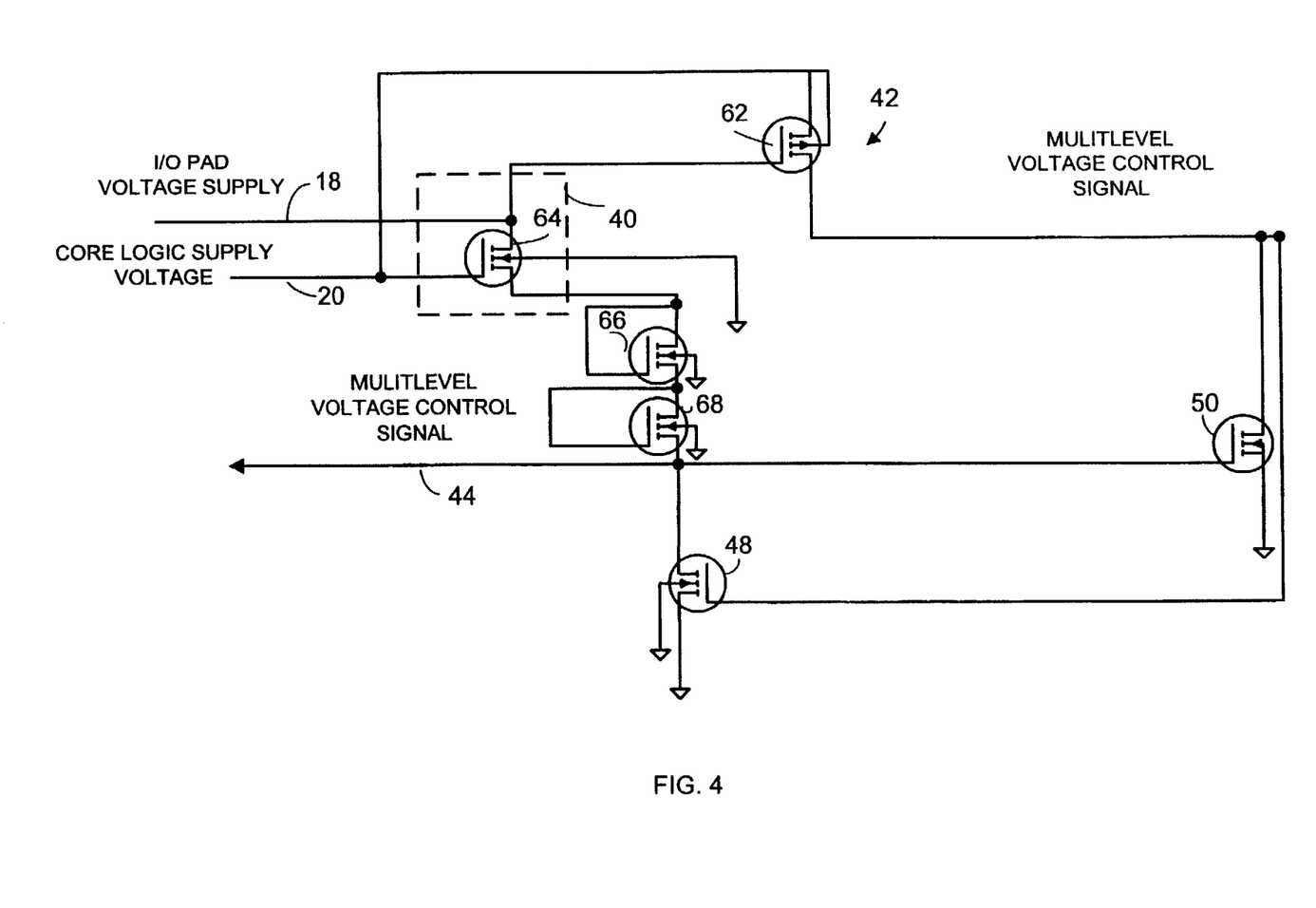
FIG. 4 is a schematic diagram illustrating another embodiment of a voltage supply discriminator circuit in accordance with one embodiment of the invention.

FIG. 4 illustrates an nmos voltage level sensor configuration which includes nmos transistor 64 serving as the first voltage level sensor 40. The nmos transistor 64 has a gate that receives the reference voltage or, for example, the core logic voltage supply. The drain receives the I/O pad voltage supply 18 and a source is coupled to a drain and gate of an nmos transistor 66. The source of nmos transistor 66 is coupled to the drain and gate of nmos transistor 68. The source of nmos transistor 68 is coupled to the gate of feedback transistor 50 and to the drain of feedback transistor 48 and outputs the multi-voltage level control signal 44. In this embodiment, all of the transistors used are single gate oxide transistors to reduce the cost and complexity of fabricating a circuit instead of using multiple gate length devices. The transistors 66 and 68 are primarily used to prevent unnecessary current sinking. Although not necessary, the above circuitry may be employed as a single integrated circuit as part of a graphics and controller chip or other suitable chip.

Figure 5:
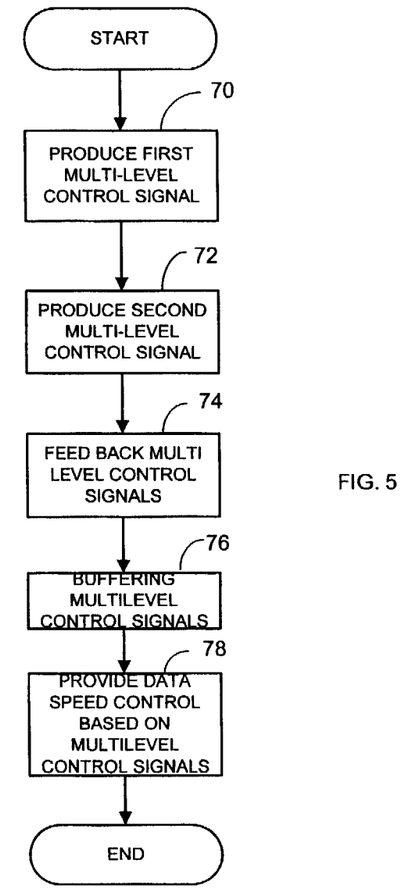
FIG. 5 illustrates a voltage supply discriminating method in accordance with one embodiment of the invention.

FIG. 5 illustrates a voltage supply discriminating method as previously set forth including in step 70, producing a first multi-level voltage control signal for an I/O pad based on at least a plurality supply voltage levels. As shown in step 72, the circuitry produces a second multi-level voltage control signal for an I/O pad based on a plurality voltage supply level, such as the I/O pad voltage supply level. The system as shown in block 74, feeds back the first and second multi-level voltage control signal to facilitate a predetermined voltage level, such as zero volts or other suitable level for each multi-level control signal.

As shown in block 76, the method may also include buffering the multi-level voltage control signals prior to the I/O pad receiving the signal. As shown in block 78, the method may also further include producing a multi-level control signal for use by a data speed changing circuit to facilitate a data speed selection based on the levels of multi-level control signals as shown in block 78. For example, the multi-level voltage control signal 44 may have for example a level of 3.3 volts or zero volts whereas the multi-level voltage control may have for example a level of 2.5 volts or zero volts. If the data speed changing circuit detects that the multi-level voltage control signal 44 is set at 3.3 volts, a slower operating speed may result indicating a higher I/O pad supply voltage. If the data speed changing circuit detects multi-level voltage control signal 46 to be a logical high, or 2.5 volts for example, the data speed changing circuit will change the frequency of the logic core circuitry to operate at a faster frequency such as for the I/O pad supply voltage is 1.5 volts.

Accordingly, the above described circuitry and method utilizes a single gate oxide configuration to facilitate automatic voltage supply discrimination resulting in the elimination of an external pad as required by previous systems. In addition, among other advantages, the system is a relatively low cost solution given the number of components used to accomplish the results. It will be recognized that the discriminator may be implemented using software or a combination of hardware and software if desired.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A voltage supply discriminator circuit comprising:

a first supply voltage level sensor circuit responsive to at least a first and second voltage supply level that produces a first multi-level voltage control signal for an input/output pad;

at least a second supply voltage level sensor circuit responsive to the at least first and second voltage supply levels that produces a second multi-level voltage control signal for the input/output (I/O) pad; and a feedback circuit operatively coupled to each of the first and second supply voltage level sensor circuits to facilitate at least one predetermined voltage level for each multi-level control signal.

2. The circuit of claim 1 including a buffer operatively coupled between the first voltage level sensor circuit and the I/O pad.

3. The circuit of claim 1 including a latching circuit operatively coupled between first voltage level sensor circuit and the I/O pad.

4. The circuit of claim 1 wherein the first and second supply voltage level sensor circuits produce the multi-level control signals for use by a data speed changing circuit to facilitate a data speed selection based on the level of the multi-level control signals and hence a detected supply voltage.

5. The circuit of claim 1 including:

a first logical voltage level sensor circuit feedback transistor having a drain operatively coupled to a drain of the second FET and a gate operatively coupled to receive the first multi-level voltage control signal, and a second logical voltage level sensor circuit feedback transistor having a gate operatively coupled to receive the second multi-level voltage control signal and a drain coupled to receive the first multi-level voltage control signal.

6. The circuit of claim 5 wherein the first and second FET transistors and the first and second logical voltage level sensor circuit feedback transistors are integrated circuits as part of a graphics controller chip.

7. A voltage supply discriminator system comprising:

a voltage discriminator circuit including:

a first supply voltage level sensor circuit responsive to at least a first and second voltage supply level that produces a first multi-level voltage control signal for an input/output pad; and at least a second supply voltage level sensor circuit responsive to the at least first and second voltage supply levels that produces a second multi-level voltage control signal;

a feedback circuit operatively coupled to each of the first and second voltage level sensor circuits to facilitate at least one predetermined voltage level for each multi-level control signal;

the input/output (I/O) pad operatively responsive to at least one of the first and second multilevel voltage control signals; and data providing circuitry operatively responsive to at least one of the first and second multilevel voltage control signals to facilitate data speed selection.

8. The system of claim 7 including a buffer operatively coupled between the first voltage level sensor circuit and the I/O pad, and a latching circuit operatively coupled between the buffer and the I/O pad.

9. The system of claim 8 wherein the first logical voltage level sensor circuit includes an first FET transistor having a source coupled to the first supply voltage and a gate coupled to a second supply voltage, and wherein the second logical voltage level sensor circuit includes a second FET transistor having a gate coupled to the first supply voltage and a source coupled to the second supply voltage.

10. The system of claim 9 wherein the feedback circuits include:

a first logical voltage level sensor circuit feedback transistor having a drain operatively coupled to a drain of the second FET and a gate operatively coupled to receive the first multi-level voltage control signal, and a second logical voltage level sensor circuit feedback transistor having a gate operatively coupled to receive the second multi-level voltage control signal and a drain coupled to receive the first multi-level voltage control signal.

11. The system of claim 10 wherein the first and second FET transistors and the first and second logical voltage level sensor circuit feedback transistors are integrated circuits as part of a graphics controller chip.

12. A voltage supply discriminating method comprising the steps of:

producing a first multi-level voltage control signal for an input/output pad based on at least a first and second voltage supply level;

producing a second multi-level voltage control signal for the input/output (I/O) pad based on at least first and second voltage supply levels; and feeding back the first and second multi-level voltage control signals to facilitate at least one predetermined voltage level for each multi-level control signal.

13. The method of claim 12 including the step of buffering at least one of the first and second multi-level voltage control signals prior to receiving by the I/O pad.

14. The method of claim 13 including the step of producing the multi-level control signals for use by a data speed changing circuit to facilitate a data speed selection based on the level of the multi-level control signals and hence a detected supply voltage.

15. A voltage supply discriminator circuit comprising:

a first supply voltage level sensor circuit responsive to at least a first and second voltage supply level that produces a first multi-level voltage control signal for an input/output pad including a first FET transistor having a source coupled to the first supply voltage and a gate coupled to a second supply voltage; and at least a second supply voltage level sensor circuit responsive to the at least first and second voltage supply levels that produces a second multi-level voltage control signal for the input/output (I/O) pad, wherein the second supply voltage level sensor circuit includes a second FET transistor having a gate coupled to the first supply voltage and a source coupled to the second supply voltage.

16. The circuit of claim 15 including:

a first logical voltage level sensor circuit feedback transistor having a drain operatively coupled to a drain of the second FET and a gate operatively coupled to receive the first multi-level voltage control signal, and a second logical voltage level sensor circuit feedback transistor having a gate operatively coupled to receive the second multi-level voltage control signal and a drain coupled to receive the first multi-level voltage control signal.

17. The circuit of claim 16 wherein the first and second FET transistors and the first and second logical voltage level sensor circuit feedback transistors are integrated circuits as part of a graphics controller chip.

* * * * *